United States Patent
Keresztes et al.

(10) Patent No.: US 11,346,542 B2
(45) Date of Patent: May 31, 2022

(54) ELECTRONIC DEVICE WITH DIFFUSIVELY ILLUMINATED HOUSING PORTIONS

(71) Applicant: Apple Inc., Cupertino, CA (US)

(72) Inventors: Janos C. Keresztes, Santa Clara, CA (US); Yu P. Sun, Yorba Linda, CA (US); Rong Liu, Sunnyvale, CA (US); Chungjae Lee, San Jose, CA (US); Ka Ho P. Poon, San Jose, CA (US); Brian P. Graves, San Francisco, CA (US); Jun Qi, San Jose, CA (US); Victor H. Yin, Cupertino, CA (US); Joel C. Yamasaki, San Francisco, CA (US); Pedro Mari, Santa Cruz, CA (US)

(73) Assignee: Apple Inc., Cupertino, CA (US)

( * ) Notice: Subject to any disclaimer, the term of this patent is extended or adjusted under 35 U.S.C. 154(b) by 63 days.

(21) Appl. No.: 16/882,307

(22) Filed: May 22, 2020

(65) Prior Publication Data

US 2020/0393121 A1 Dec. 17, 2020

Related U.S. Application Data

(60) Provisional application No. 62/861,210, filed on Jun. 13, 2019.

(51) Int. Cl.
*F21V 33/00* (2006.01)
*F21V 5/00* (2018.01)
*F21V 23/04* (2006.01)
*F21V 19/00* (2006.01)
*F21V 3/04* (2018.01)
*F21V 8/00* (2006.01)
*F21Y 115/00* (2016.01)

(52) U.S. Cl.
CPC ............ *F21V 33/0056* (2013.01); *F21V 3/04* (2013.01); *F21V 5/007* (2013.01); *F21V 19/001* (2013.01); *F21V 23/0485* (2013.01); *G02B 6/0045* (2013.01); *G02B 6/0065* (2013.01); *F21Y 2115/00* (2016.08)

(58) Field of Classification Search
CPC ...... F21V 33/0056; F21V 15/01; F21V 5/007; F21V 5/002; F21V 5/004; F21V 5/005; F21S 6/002
See application file for complete search history.

(56) References Cited

U.S. PATENT DOCUMENTS 3,532,876 A * 10/1970 Muller et al. ............. F21V 5/02
362/330
3,671,101 A * 6/1972 Finch ....................... G02B 5/12
359/546

(Continued)

*Primary Examiner* — Ismael Negron
(74) *Attorney, Agent, or Firm* — Treyz Law Group, P.C.; Jason Tsai

(57) ABSTRACT

An electronic device includes a housing, a speaker, control circuitry, a plurality of light-emitting components configured to emit light through an upper housing wall or other housing structure. A lens diffuser layer having lenses overlapping respective light-emitting components, a textured diffuser layer formed from textured coatings on a substrate, and a volume diffuser layer having light-scattering structures in a polymer layer might be included to project light from the light-emitting components. A light-guiding portion of the lens diffuser layer may guide light to a circular peripheral edge to form an illuminated ring visible through the upper housing wall.

20 Claims, 9 Drawing Sheets

(56) References Cited

U.S. PATENT DOCUMENTS

| | | | |
|---|---|---|---|
| 3,716,709 A * | 2/1973 | Goytisolo Taltavull | F21V 5/04 362/330 |
| 3,949,350 A * | 4/1976 | Smith | F21S 6/002 362/86 |
| 4,809,584 A * | 3/1989 | Forrest | A63J 17/00 340/815.46 |
| 5,034,864 A * | 7/1991 | Oe | G09F 13/14 362/224 |
| 5,173,810 A * | 12/1992 | Yamakawa | F21V 7/0091 359/819 |
| 5,771,328 A * | 6/1998 | Wortman | G02B 6/0053 385/146 |
| 6,333,509 B1 * | 12/2001 | Lumpp | F21V 7/005 250/504 R |
| 6,755,556 B2 * | 6/2004 | Gasquet | F21S 43/315 362/329 |
| 7,255,456 B2 * | 8/2007 | Yao | G02B 5/0215 362/225 |
| 7,275,849 B2 * | 10/2007 | Chinniah | F21K 9/61 362/555 |
| 7,349,163 B2 * | 3/2008 | Angelini | F21V 7/0091 359/708 |
| 7,438,444 B2 * | 10/2008 | Pao | G02B 19/0071 362/327 |
| 7,461,960 B2 * | 12/2008 | Opolka | F21V 5/045 362/545 |
| 7,621,657 B2 * | 11/2009 | Ohkawa | G02B 5/045 362/309 |
| 7,798,679 B2 * | 9/2010 | Kokubo | G02B 19/0061 362/335 |
| 7,896,521 B2 * | 3/2011 | Becker | F21V 5/007 362/244 |
| 8,075,157 B2 * | 12/2011 | Zhang | G02B 19/0028 362/249.02 |
| 8,220,958 B2 * | 7/2012 | Montagne | G02B 19/0014 362/235 |
| 8,299,903 B2 * | 10/2012 | Haase | G08B 7/06 340/326 |
| 8,633,641 B2 * | 1/2014 | Lin | F21V 5/04 313/327 |
| 8,827,482 B2 | 9/2014 | Yoshikawa | |
| 9,134,006 B2 * | 9/2015 | Rodgers | F21V 5/04 |
| 9,494,300 B2 * | 11/2016 | Takayama | F21V 13/04 |
| 9,736,899 B2 * | 8/2017 | Park | F21S 10/06 |
| 9,930,444 B1 * | 3/2018 | Stanley | H04R 1/2826 |
| 10,420,180 B2 * | 9/2019 | Fujii | F21V 11/06 |
| 10,462,545 B2 * | 10/2019 | Rao | G06F 1/1605 |
| 10,622,485 B2 | 4/2020 | Honda et al. | |
| 10,838,256 B2 * | 11/2020 | Zhang | G02B 19/0061 |
| 11,022,271 B2 * | 6/2021 | Reutter | F21V 5/005 |
| 11,118,745 B2 * | 9/2021 | Zheng | F21S 6/004 |
| 2004/0263039 A1 * | 12/2004 | Takei | G02B 5/045 313/110 |
| 2011/0115695 A1 * | 5/2011 | Lin | G02F 1/133606 345/102 |
| 2012/0075852 A1 * | 3/2012 | Chang | F21V 5/02 362/235 |
| 2013/0009927 A1 | 1/2013 | Lowles et al. | |
| 2013/0294074 A1 * | 11/2013 | Engel | F21V 21/049 362/235 |
| 2014/0321127 A1 | 10/2014 | Chang et al. | |
| 2015/0345734 A1 * | 12/2015 | Hsu | G02B 5/0278 362/311.01 |
| 2021/0018159 A1 * | 1/2021 | Vredenborg | F21V 5/008 |
| 2021/0071846 A1 * | 3/2021 | Liu | F21S 9/02 |

* cited by examiner

ELECTRONIC DEVICE WITH DIFFUSIVELY ILLUMINATED HOUSING PORTIONS

This application claims the benefit of provisional patent application No. 62/861,210, filed Jun. 13, 2019, which is hereby incorporated by reference herein in its entirety.

FIELD

This relates generally to electronic devices and, more particularly, to electronic devices with light-emitting devices.

BACKGROUND

Electronic devices such as voice-controlled assistant devices may include light-emitting components. During operation, the light-emitting component may emit patterns of light that serve as visual feedback. The feedback helps confirm to a user that an electronic device is operating as desired.

It can be challenging to incorporate light-emitting components into an electronic device. If care is not taken, the patterns of light that are emitted will not appear as intended, the appearance of the device may not be as desired, or the device may be overly bulky.

SUMMARY

An electronic device such as a voice-controlled speaker device may have a housing. A speaker, other input-output components, and control circuitry may be mounted within the housing. During operation, the control circuitry can direct a set of light-emitting components to emit light that passes through the housing. The emitted light may, as an example, serve as visual feedback to confirm that a voice command or other input has been received from a user.

The housing may have an upper housing wall that overlaps the light-emitting components. The upper housing wall, which may sometimes be referred to as a top cap, may be formed from a slightly domed polymer disk or other suitable housing wall structure.

Before passing through the upper housing wall for viewing by a user, light from the light-emitting components may be spread laterally by multiple light diffusing layers. The light diffusing layers may include a lens diffuser layer having lenses overlapping respective light-emitting components, a textured diffuser layer formed from textured coatings on a substrate, and a volume diffuser layer having light-scattering structures in a polymer layer.

The lens layer may be formed from a transparent member with integral lenses having curved inner surfaces and opposing curved outer surfaces. In some configurations, the lenses may have surfaces with cuspoid-shaped cross-sectional profiles. A light-guiding portion of the transparent member may guide light to a circular peripheral edge to form an illuminated ring visible through the upper housing wall.

DETAILED DESCRIPTION

Electronic devices may have light-emitting devices. A light-emitting device may be used to provide a user with visual feedback during operation of an electronic device. For example, in a voice-controlled device, visual feedback such as moving patterns of lights of different colors may be used to visually confirm to the user that the voice-controlled device is responding to a voice command. Visual output may also include status indicator information and other output.

Figure 1:
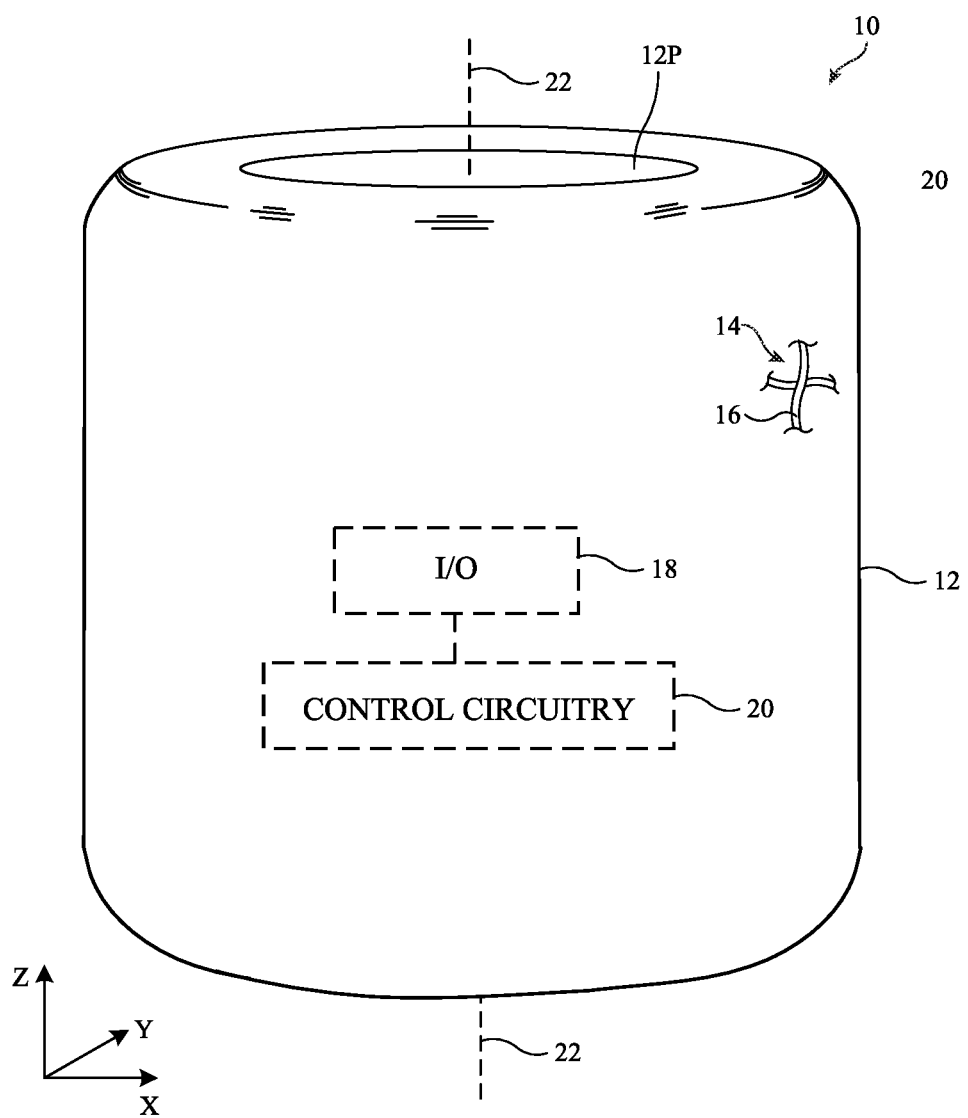
FIG. 1 is a perspective view of an illustrative voice-controlled electronic device having a light-emitting device in accordance with an embodiment.

FIG. 1 is a perspective view of an illustrative electronic device that includes a light-emitting device to provide visual output. In the example of FIG. 1, device 10 is a voice-controlled device such as a voice-controlled speaker. If desired, device 10 may be an electronic device or an accessory for an electronic device such as a laptop computer, a computer monitor containing an embedded computer, a tablet computer, a cellular telephone, a media player, or other handheld or portable electronic device, a smaller device such as a wristwatch device, a pendant device, a headphone or earpiece device, a device embedded in eyeglasses or other equipment worn on a user's head, or other wearable or miniature device, a television, a computer display that does not contain an embedded computer, a gaming device, a navigation device, an embedded system such as a system in which equipment for device 10 is mounted in a kiosk, in an automobile, airplane, or other vehicle, other electronic equipment, or equipment that implements the functionality of two or more of these devices.

As shown in FIG. 1, device 10 may include a housing such as housing 12. Housing 12 may have a cylindrical shape with rounded upper and lower ends of the type shown in FIG. 1 or other suitable shape (e.g., a pyramidal shape, a conical shape, a frustoconical shape, a box shape such as a rectangular box shape, a spherical shape, etc.). Housing 12 may include support structures formed from metal, polymer, ceramic, glass, wood, other materials, and/or combinations of these materials. The shape of housing 12 may be selected to form an enclosure suited to the type of device 10 for which the housing is being used. As an example, in scenarios in which device 10 is a voice-controlled electronic device, housing 12 may be cylindrical, pyramidal, box-shaped, conical, spherical, or other shapes suitable for enclosing one or more speakers, in configurations in which device 10 is a laptop computer, housing 12 may have upper and lower thin box-shaped portions that are joined with a hinge and that can respectively house a display and a keyboard, in configurations in which device 10 is a computer monitor containing an embedded computer, housing 12 may have a slender box shape with optionally curved rear housing walls that can hold a display and be mounted on a stand, in configurations in which device 10 is a tablet computer, cellular telephone, media player, or other handheld or portable electronic device, housing 12 may have a rectangular outline and a thin depth, in configurations in which device 10 is a smaller device such as a wristwatch device or a pendant device, housing 12 may have a thin profile and an outline that is rectangular, square, hexagonal, triangular, oval, or circular, in configurations in which device 10 is a headphone or earpiece device, housing 12 may have a shape configured to fit on or in a user's ear, in configurations in which device 10 is a pair of eyeglasses or other equipment worn on a user's head, housing 12 may have a head-mountable shape, in configurations in which device 10 is a jacket or other item of clothing (e.g., a hat, belt, wrist band, headband, shirt, pants, shoes, etc.), housing 12 may be formed from layers of fabric or other material configured to allow device 10 to be worn on a user's body, in configurations in which device 10 is a television, a computer display that does not contain an embedded computer, a gaming device, or a navigation device, housing 12 may have a rectangular outline, an outline with curved sides and/or straight sides, a box shape, a cylindrical shape, and/or other suitable shapes, in configurations in which device 10 is a kiosk, housing 12 can form a pedestal or other shape suitable for a kiosk, in configurations in which device 10 forms part of an automobile, airplane, or other vehicle, housing 12 may form a dashboard, console, door, window, seat, body panel, or other portion of the vehicle, in configurations in which device 10 is a removable external case for electronic equipment, housing 12 may have the shape of a sleeve or other structure with a recess for receiving the electronic equipment, in configurations in which device 10 is a strap, wrist band, necklace or headband, housing 12 may have a strip shape, in configurations in which device 10 forms a case, bag, or wallet, housing 12 may have surfaces that form the walls of the case and/or sides of the bag or wallet and/or that forms straps and/or other structures for the case or bag, and in configurations in which device 10 is part of furniture, housing 12 may be configured to form a part of a chair, sofa, or other seating (e.g., cushions or other seating structures). In the illustrative configuration of FIG. 1, housing 12 has a cylindrical shape suitable for an electronic device such as a voice-controlled speaker with Internet access. Housing 12 may have other shapes and may be incorporated into other devices, if desired. The configuration of FIG. 1 is presented as an example.

If desired, device 10 may include fabric 14. Fabric 14 may form all or part of a housing wall or other layer in an electronic device, may form the outermost layer of device 10, may form one or more inner covering layers, may form internal structures in an electronic device, or may form other fabric-based structures. Device 10 may be soft (e.g., device 10 may have a fabric surface that yields to a light touch), may have a rigid feel (e.g., the surface of device 10 may be formed from a stiff fabric), may have a surface that is textured, that is smooth, that has ribs or other patterned textures, and/or may include portions formed from non-fabric structures of plastic, metal, glass, crystalline materials, ceramics, or other materials.

Fabric 14 may include intertwined strands of material such as strands 16. Fabric 14 may, for example, include warp knit fabric that is formed by warp knitting of strands 16 and/or may include woven fabric, fabric with braided strands of material, etc. Strands 16 may be single-filament strands (sometimes referred to as fibers or monofilaments) or may be strands of material formed by intertwining multiple monofilaments of material together (sometimes referred to as yarns).

Strands 16 may be formed from polymer, metal, glass, graphite, ceramic, natural materials such as cotton or bamboo, or other organic and/or inorganic materials and combinations of these materials. Conductive coatings such as metal coatings may be formed on non-conductive material. For example, plastic strands in fabric 14 may be coated with metal to make them conductive. Reflective coatings such as metal coatings may be applied to make strands reflective. Strands formed from white polymer (e.g., light-scattering particles in polymer) and/or that are coated with white polymer may help reflect light in some configurations. Darkly colored strands may also be used. If desired, strands may be formed from bare metal wires or metal wire intertwined with insulating monofilaments (as examples). Bare metal strands and strands of polymer covered with conductive coatings may be provided with insulating polymer jackets. In some configuration, strands 16 may include optical fibers.

In an illustrative configuration, some or all of the upper surface of housing 12 such as portion 12P may be formed from rigid polymer, rigid glass, or other non-fabric structure and the sidewall surfaces of housing 12 may be covered with fabric 14 (e.g., to create a cover layer for the sidewalls that is transparent to sound). Portion 12P, which may sometimes be referred to as an upper housing wall or top cap, may be a disk. For example, portion 12P may be formed from a disk-shaped polymer or glass member with a slightly curved cross-sectional profile and a circular outline (e.g., portion 12P may form a slightly protruding dome shape or other suitable housing shapes). Portion 12P may be formed from transparent materials. The transparent materials may be translucent (hazy) or may exhibit low haze. The use of translucent material and/or other transparent material for portion 12P allows underlying light-emitting components in the interior of device 10 to emit light that passes through portion 12P. For example, portion 12P may be formed from clear material, material with a neutral tint (e.g., dark polymer or glass that allows light to pass), or material with a non-neutral color (e.g., blue, red, etc.).

Portion 12P may overlap a touch sensor. For example, a two-dimensional capacitive touch sensor may be formed from an array of capacitive touch sensor electrodes that are overlapped by portion 12P. Capacitive touch sensor circuitry may be coupled to the touch sensor electrodes and may gather user touch input through portion 12P. The capacitive touch sensors may be formed directly on the inner surface of portion 12P, which therefore serves as a substrate for the touch sensors, or may be formed on separate supporting structures (e.g., a separate polymer film or other separate substrate). Capacitive touch sensor electrodes may be formed from conductive material such as metal, transparent conductive material such as indium tin oxide, or other conductive materials. If desired, one-dimensional, two-dimensional, and/or three-dimensional sensors such as proximity sensors, optical touch sensors, force sensors, image sensors, time-of-flight sensors, vibration sensors such as accelerometers, and/or other sensors may be formed under portion 12P or other portions of housing 12 (e.g., instead of a two-dimensional capacitive touch sensor or in addition to a two-dimensional capacitive touch sensor). If desired, sensors may operate through fabric sidewalls or other housing structures.

Device 10 may include control circuitry 20. Control circuitry 20 may include microprocessors, microcontrollers, application-specific integrated-circuits, digital signal processors, baseband processors, and/or other controllers and may include storage such as random-access memory, read-only memory, solid state drives, and/or other storage and processing circuitry.

Control circuitry 20 may gather information from sensors and other circuitry in input-output devices 18 and may use input-output devices 18 to supply output. Input-output devices 18 may, for example, include audio devices such as microphones and speakers. Microphones can gather audio input (e.g., sound that passes through fabric 14 such as voice commands for controlling the operation of device 10). Speakers can produce audio output (e.g., sound that passes through fabric 14). Sensors in input-output devices 18 may include touch sensors, force sensors, capacitive sensors, optical sensors, proximity sensors, strain gauges, temperature sensors, moisture sensors, gas sensors pressure sensors, magnetic sensors, position and orientation sensors (e.g., accelerometers, gyroscopes, and/or compasses), and/or other sensors. Sensors such as these may, if desired, be overlapped by housing portion 12P (e.g., a polymer layer or glass layer).

Light-emitting diodes, displays, and other visual output devices may be used in supplying visual output to a user. As an example, visual output devices may be used to form illuminated buttons, displays that display images, visual feedback areas that display still and/or moving patterns of light to indicate to a user that a command has been received and/or is being processed by control circuitry 20, etc. Commands may be received using a touch sensor, voice commands may be received by control circuitry 20 using a microphone in input-output devices 18, and other input may be received using input-output devices 18. If desired, buttons, joysticks, haptic output components, and/or other input-output components may be provided in input-output devices 18 to gather input from a user and to provide a user with output. Wireless circuitry in circuitry 20 (e.g., wireless local area network circuitry, cellular telephone circuitry, etc.) may be used to support wireless communications with external equipment (e.g., to form a communications link with internet-based equipment or other electronic equipment).

Light-emitting components (e.g., lasers or light-emitting diodes) may be arranged in a pattern under portion 12P of housing 12 or other suitable portion of housing 12. In general, any suitable light-based output may be supplied by light-based output devices in device 10. For example, displays with arrays of pixels may display images, text output devices such as segmented light-emitting diode displays may display text, and status indicator lights may provide light output indicative of device operating status (e.g., a power on/off status, battery level status, volume level status, mute/non-muted status, etc.). In an illustrative arrangement, which may sometimes be described as an example, a light-emitting device in device 10 is formed from a set of light-emitting components that are located under housing portion 12P. The light-emitting device may be used to provide status information, decorative patterns, visual feedback (e.g., confirmation of receipt by control circuitry 20 of device 10 of voice commands), and/or other visual information that is visible through portion 12P.

Figure 2:
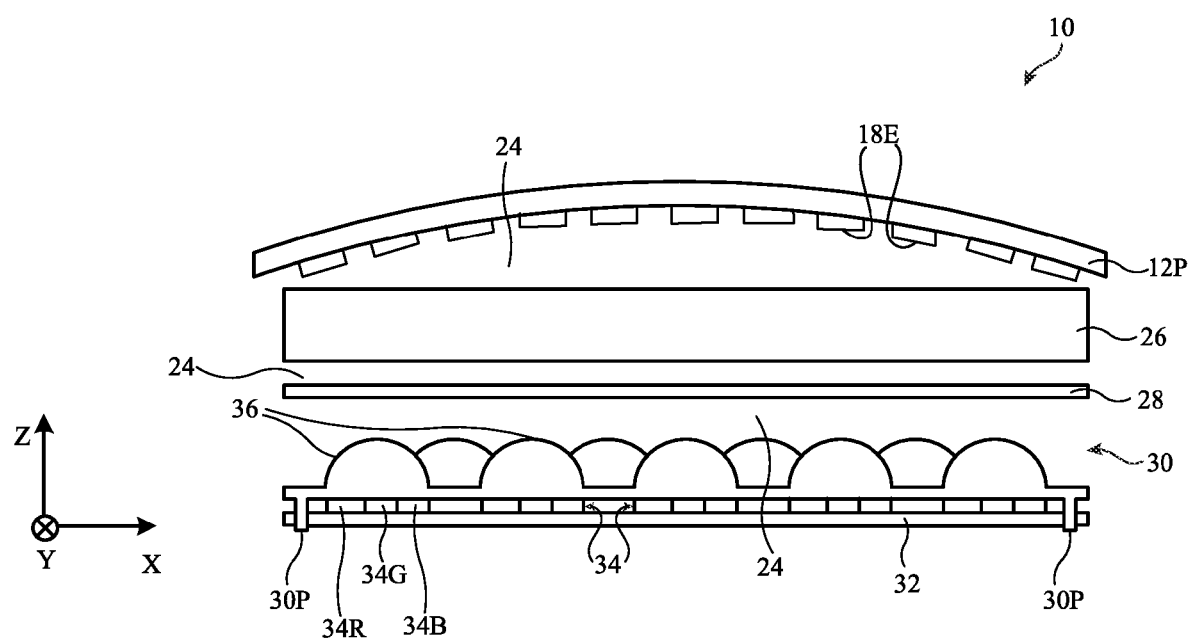
FIG. 2 is a cross-sectional side view of a portion of the device of FIG. 1 showing how optical elements such as diffuser layers may be interposed between a translucent or transparent upper housing wall and a set of light-emitting components in accordance with an embodiment.

To help enhance the appearance of visual output provided through portion 12P, the light-emitting device may include light-spreading structures. The light-spreading structures may include one or more layers of structures that spread and mix light in lateral directions such as directions in the X-Y plane of FIG. 1 as light propagates outwardly (e.g., upwardly in the Z direction) from light-emitting components located under portion 12P. A cross-sectional side view of a portion of device 10 in the vicinity of housing portion 12P in an illustrative configuration in which light-emitting components are overlapped by three light-spreading structures is shown in FIG. 2. In the example of FIG. 2, these light spreading structures include lens diffuser layer 30, textured diffuser layer 28, and volume diffuser layer 26. More light-spreading structures or fewer light-spreading structures may be used in device 10, if desired (e.g., fewer than three layers, more than three layers, etc.). These light-spreading structures may include light-diffusing structures formed from solid transparent structures with curved surfaces (e.g., lens structure), textured films, light-scattering structures embedded in clear polymer or other material, and/or other light scattering and diffusing structures that help homogenize emitted light and reduce hotpots. In some configurations, portions of the light-spreading structures or other optical layers in device 10 may help guide light that has been emitted from light-emitting components.

Light-emitting components 34 may be mounted on a support structure. In the example of FIG. 2, light-emitting components 34 have been mounted on printed circuit 32. Printed circuit 32 may contain signal lines that convey signals from control circuitry 20 to components 34 so that components 34 may emit desired amounts of light. The color of emitted light may be controlled by adjusting the emitted color from each of components 34. With an illustrative configuration, each component 34 contains components such as red light-emitting component 34R (e.g. a red light-emitting diode or red laser), green light-emitting component 34G (e.g., a green light-emitting diode or green laser), and blue light-emitting component 34B (e.g., a blue light-emitting diode or blue laser). With this type of configuration, the color of light that is emitted can be adjusted by adjusting the relative light intensity from each of the colored subcomponents of each component 34. The pattern of light that is emitted (e.g., the location in the X-Y plane of the emitted light) can be controlled by controlling components 34 (e.g., to turn on a first component 34 on the left side of device 10 while turning off a component 34 on the right side of device 10, to display blue light from one component and red from another, to display a pattern with a gradient of light intensity, etc.). If desired, flashing light effects, chasing light effects, lighting effects involving emission of light patterns that swirl or otherwise move about the X-Y plane of FIG. 2 may be produced.

Lens diffuser layer 30 may, if desired, have alignment features such as protrusions 30P that are received within corresponding alignment openings in printed circuit 32. Lens diffuser layer 30 may have an array of lenses 36. Each lens 36 may overlap a respective light-emitting component 34. Layer 30 may be formed from a solid molded (and/or machined) layer of clear material (e.g., polymer) and/or may include separate components (e.g., individual lenses supported in a desired pattern using a frame). Configurations in which layer 30 is a unitary planar member with molded lens structures forming lenses 36 may sometimes be described herein as an example.

Air gaps may separate light-emitting components 34 from the inner surfaces of lenses 36. Air gaps 24 may also separate layers 30, 28, and 26 from each other and may separate layer 26 from housing portion (upper housing wall) 12P. The presence of air gaps 24 may help promote light mixing. If desired, one or more of these air gaps may be omitted (e.g., by attaching adjacent layers with a layer of clear adhesive by forming the structures of one layer as a coating on another layer, etc.).

Capacitive touch sensor electrodes for forming a capacitive touch sensor such as capacitive touch sensor electrodes 18E may be formed on a stand-alone substrate layer (e.g., a polymer film overlapped by housing portion 12P) and/or may be deposited and patterned directly on the inner surface of a polymer or glass housing member such as housing portion 12P. By forming electrodes 18E on the inner surface of housing portion 12P, part count may be reduced and assembly operations may be facilitated. This arrangement also allows portion 12P to have a slightly domed shape which can help create an air gap between portion 12P and underlying structures to facilitating light mixing. Arrangements in which capacitive touch sensor electrodes are formed on the inner surface of portion 12P allow touch sensor measurements to be taken close to the exterior surface of portion 12P, which may enhance touch sensor accuracy. If desired, other sensors and/or other input-output devices 18 may be overlapped by housing portion 12P. The arrangement of FIG. 2 in which a two-dimensional capacitive touch sensor formed from electrodes 18E is formed under housing portion 12P is illustrative.

Figure 3:
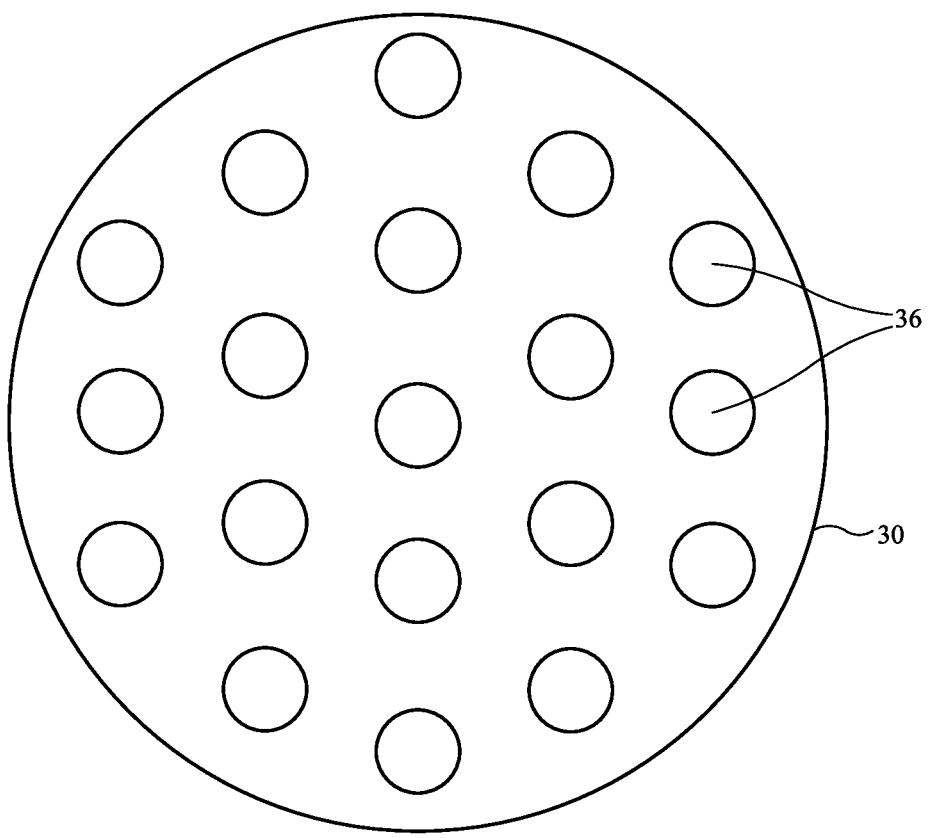
FIG. 3 is a top view of an illustrative visual output system based on a light-emitting device with a set of light-emitting diodes or other light-emitting components covered with light spreading structures such as lenses and diffuser layers in accordance with an embodiment.

Light-emitting components 34 and corresponding overlapping lenses 36 in lens diffuser layer 30 may have any suitable pattern. As an example, lenses 36 (and the components 34 that are overlapped by lenses 36) may be arranged in a hexagonal pattern as shown in FIG. 3. In this illustrative arrangement, there are 19 lenses 36 and therefore 19 corresponding components 34 (and 19*3 light-emitting diodes or lasers in a system with three differently colored sets of light emitters). More lenses 36 and more components 34 or fewer lenses and fewer components 34 may be used if desired. For example, there may be at least 10 components and lenses, at least 50 components and lenses, at least 100 components and lenses, fewer than 1000 components and lenses, fewer than 120 components and lenses, or fewer than 70 components and lenses, as examples.

Lens diffuser layer 30 may serve as a course diffuser that spreads light widely (but not necessarily smoothly). Textured diffuser layer 28 may serve as a medium diffuser that spreads light moderately (e.g., less strongly than layer 30). Although layer 28 tends to spread light less aggressively than layer 30, the uniformity of the light exiting layer 28 will be greater than the uniformity of the light exiting layer 30. Volume diffuser layer 26 may spread light lightly (e.g., less aggressively than layer 28) and may output light that is more uniform than the light exiting layer 28. With this type of multi-layer diffusing arrangement, the amount of lateral uniformity (hotspot reduction) achieved as light passes successively through layers 30, 28, and 26 tends to increase as each layer is passed. For example, light that has passed through layer 30 may have a given uniformity. After this light passes through layer 28, the light may have enhanced uniformity across the X-Y plane. The intensity of this light may, in turn, be rendered even more uniform after passing through layer 26. The use of multiple light-spreading layers (coarse, medium, and fine) may help optimize overall light uniformity within a given amount of light propagation distance (Z-axis distance in this example) versus local contrast when displaying an illumination pattern.

Figure 4:
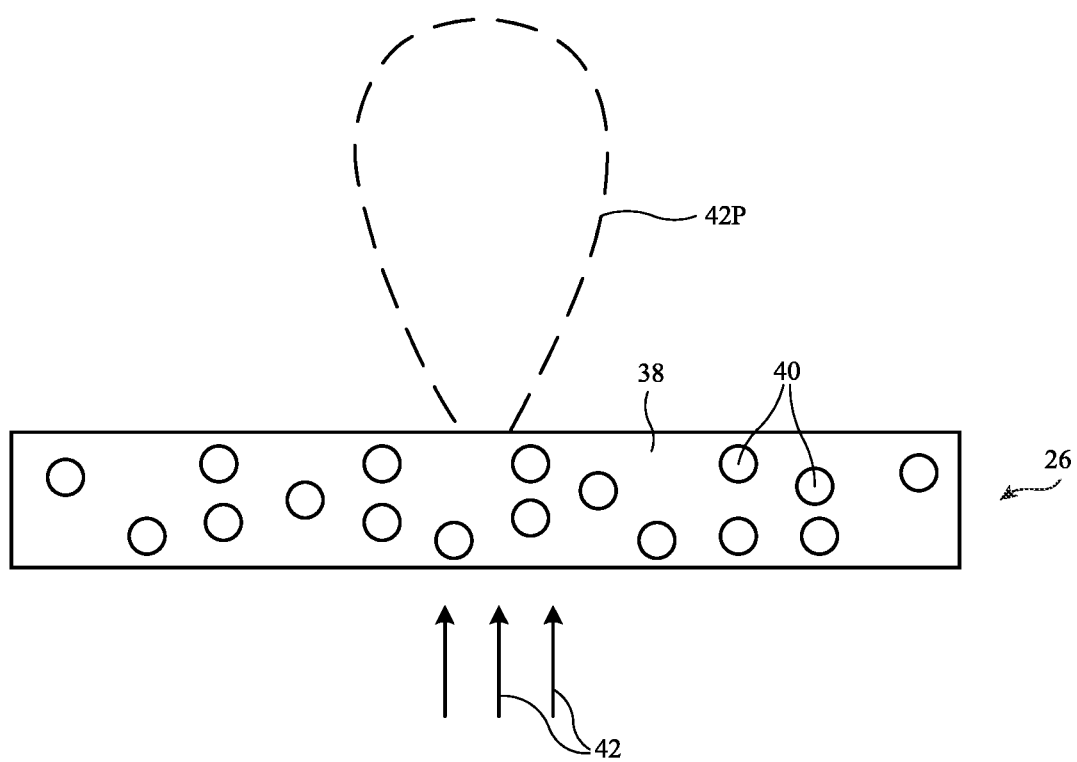
FIG. 4 is a cross-sectional side view of an illustrative optical element for light spreading such as a volume diffuser that is formed from light-scattering structures embedded in a clear material such as a sheet of polymer or glass and that serves as a fine diffuser in accordance with an embodiment.

FIG. 4 is a cross-sectional side view of an illustrative volume diffuser layer. Volume diffuser layer 26 of FIG. 4 contains light-scattering structures 40 embedded in material 38. Material 38 may be glass, polymer, or other transparent material. Light-scattering structures 40 may include voids (vacuum-filled cavities, gas-filled cavities such as air bubbles, cavities filled with nitrogen or other inert gases, etc.) and/or may include light-scattering particles having refractive index values that differ from that of material 38. The light-scattering particles may include, for example, titanium dioxide particles or other particles of inorganic dielectric. If desired, colorant (e.g., dye and/or pigment) may be incorporated into material 38. Colorant may also be incorporated into other layers in device 10 such as layers 28 and/or 30 and/or portion 12P.

As light 42 passes through layer 26, the presence of structures 40 scatters light 42 laterally. As shown by scattered light intensity pattern 42P, the light scattering process of layer 26 may result in smooth and uniform light scattering.

Figure 5:
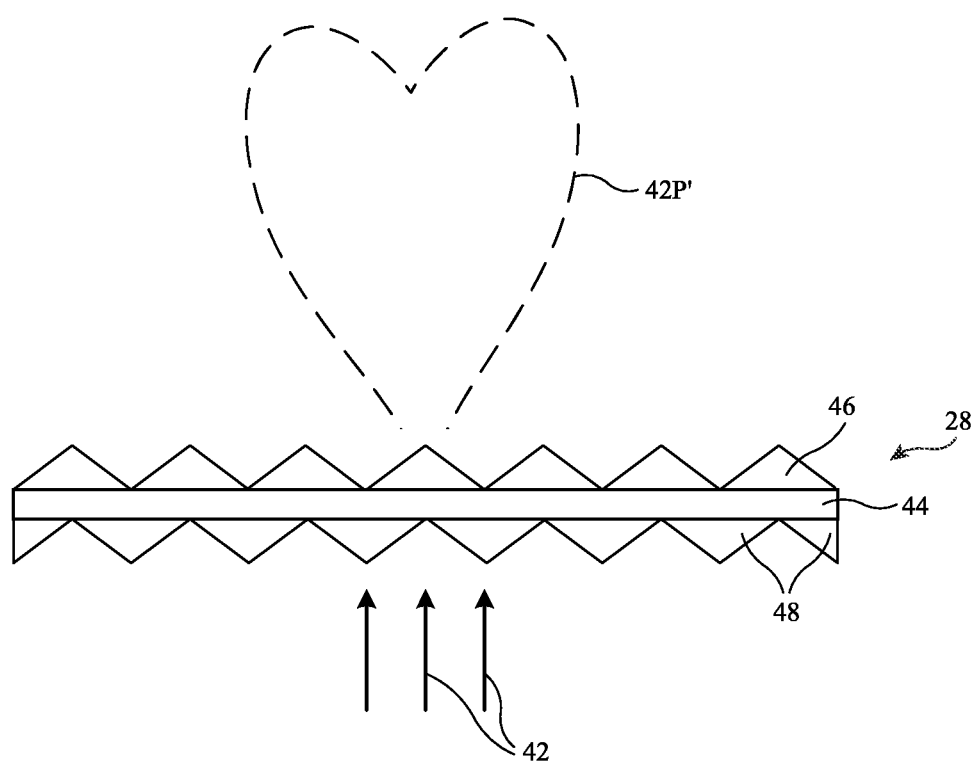
FIG. 5 is a cross-sectional side view of an illustrative optical element for light spreading such as a textured film that serves as a moderate diffuser in accordance with an embodiment.

Before light 42 reaches layer 28, more aggressive and coarser light scattering may be performed by textured diffuser layer 28 of FIG. 5. As shown in FIG. 5, layer 28 may include a polymer film or other substrate 44 that is coated with textured coating layer(s) such as illustrative upper coating layer 46 and illustrative lower coating layer 48. Layers 46 and 48 may have textured structures such as pyramidal structures, spherical structures, conical structures, frustoconical structures, ridges, and/or other protrusions, and/or grooves, pits, or other depressions to help scatter light 42. As shown by scattered light intensity pattern 42P' of FIG. 5, layer 28 may tend to scatter light 42 more strongly but less evenly than layer 26. Accordingly, light 42 preferably passes through layer 28 before passing through layer 26.

Figure 6:
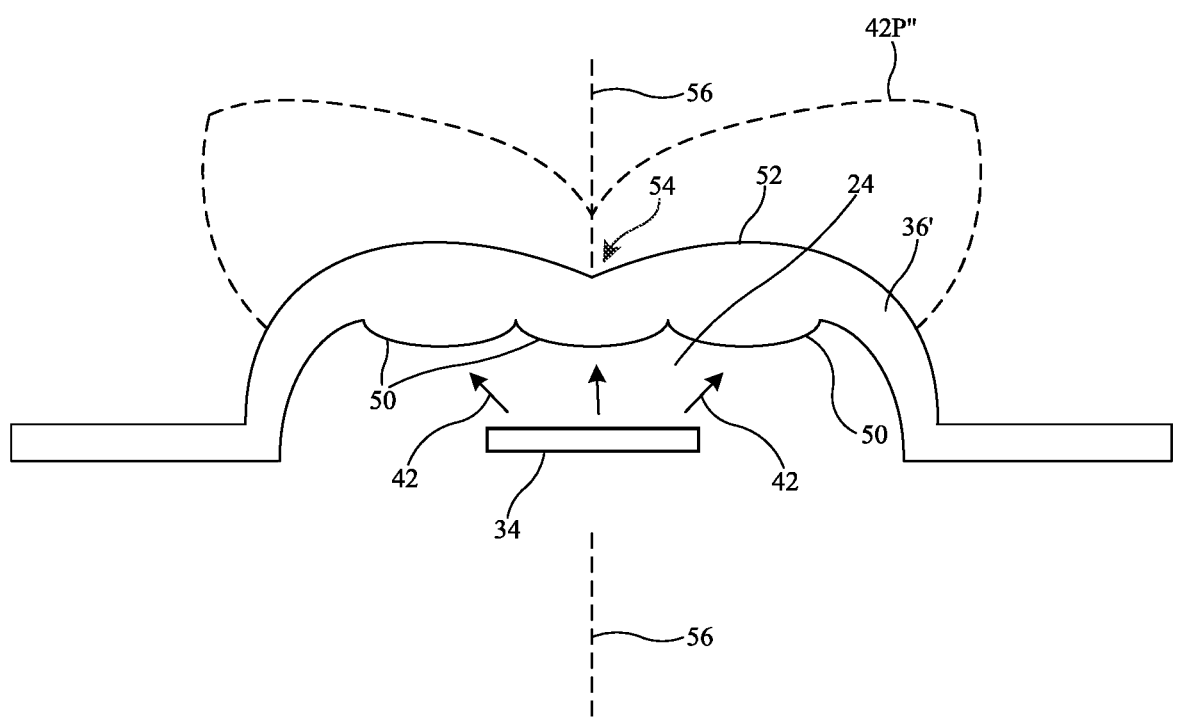
FIG. 6 is a cross-sectional side view of an illustrative optical element for light spreading such as an air-gap lens (lens array) in a lens layer that serves as a coarse diffuser in accordance with an embodiment.

Before light 42 reaches layer 28, even more aggressive and coarser light spreading in the lateral X-Y plane (sometimes referred to as coarse light scattering) may be performed by lens diffuser layer 30. A portion of lens diffuser layer 30 is shown in FIG. 6. As shown in FIG. 6, lens 36' of layer 30 may have an outer surface with a cuspoid center (e.g., depression 54 in the outer surface of lens 36' may be aligned with longitudinal lens axis 56). Lens 36' may, as an example, have an outer surface that is effectively a combination of two tilted convex lenses. The corresponding inner surface of lens 36' may have multiple bulging protrusions 50 with a curved (e.g., convex) cross-sectional profile. The inner surface of lens 36' is separated from light-emitting components such as component 34 by air gaps 24. The shape of lens 36' including the cuspoid shape of the outer surface of lens 36' produces a batwing light intensity profile, as shown by the off-axis elevated-intensity lobes of light intensity pattern 42P'''. The batwing intensity pattern provides an enlarged illuminance spot size (e.g., a wider point spread function) for a given vertical height (a given distance along the Z axis of FIG. 2). The shape of lens 36' thereby helps avoid any hotspot in the center of lens 36' (e.g., to prevent excess light from propagating straight through lens 36' along axis 56). Arrangements in which lens 36' has other layouts that promote coarse light mixing may be used, if desired.

Figure 7:
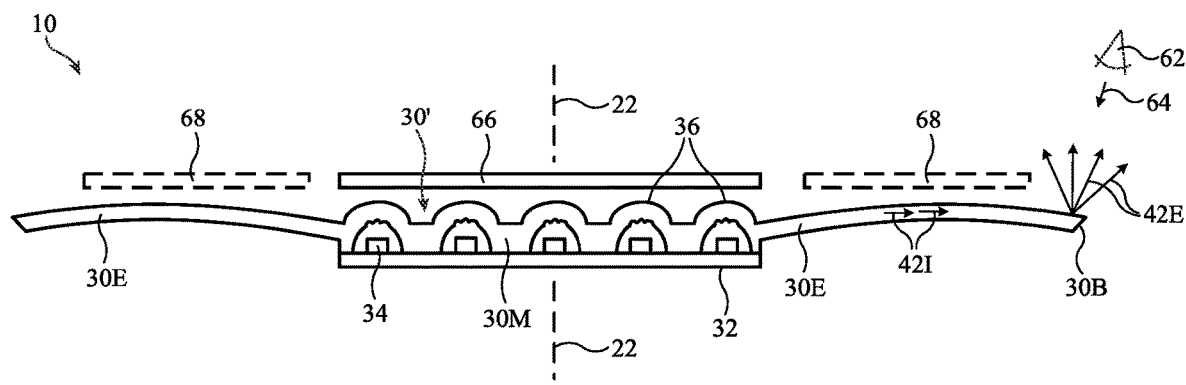
FIG. 7 is a cross-sectional side view of an illustrative optical element such as a lens layer with light spreading and light guiding for use in a light-emitting device in accordance with an embodiment.

FIG. 7 is a cross-sectional side view of a portion of device 10 in an illustrative configuration in which lens diffuser layer 30' has an extended portion 30E (sometimes referred to as a light-guiding portion, light-guiding layer, light guide, waveguide structure, radially extended layer or portion, etc.). Portion 30E may serve as a light-guiding structure (light-guiding layer) that guides light laterally that has been emitted from components 34 (e.g., light may be guided radially outward). Layer 30' may, as an example, have a circular shape (e.g., layer 30' may be a clear polymer member having a disk shape and a circular footprint when viewed along axis 22). During operation, light emitted by components 34 may be coarsely scattered by lenses 36 in main portion 30M of lens diffuser layer 30'. This coarsely scattered light may pass through additional layers 66 (e.g., layers 28, 26, portion 12P, etc.). Some of the light emitted by components 34 may also be guided laterally within portion 30E as guided light rays 42I in accordance with the principal of total internal reflection. Due to this light guiding process, little or no light in portions 30E scatters upwardly through overlapping structures 68 (e.g., printed circuits, cosmetic layers, components, etc.). At the peripheral edge of portion 30E or at other suitable portions of the light-guiding structures of layer 30', total internal reflection may be locally frustrated (defeated), causing light 42I to be emitted outwardly as light 42E. In the example of FIG. 7, the circular peripheral edge of portion 30E has a light-extraction structure (sometimes referred to as a light-scattering structure) such as bevel 30B that cause light 42I to be extracted and thereby emitted from the circular periphery of layer 30' and sent outwardly through the housing of device 10 as emitted (extracted) light 42E. Light 42E may, as an example, have a ring shape when viewed from a user of device 10 such as viewer 62 who is viewing device 10 in direction 64. If desired, other light-extraction (light-scattering) structures may be provided in addition to or instead of bevel 30B. These light-extraction (light-scattering) structures may include light-scattering particles, textures, groves, pits, and other recesses, bumps, ridges, or other protrusions, and/or other light-extraction structures. These light-extraction structures may be located at the peripheral edge of layer 30' and/or at other locations.

Figure 8:
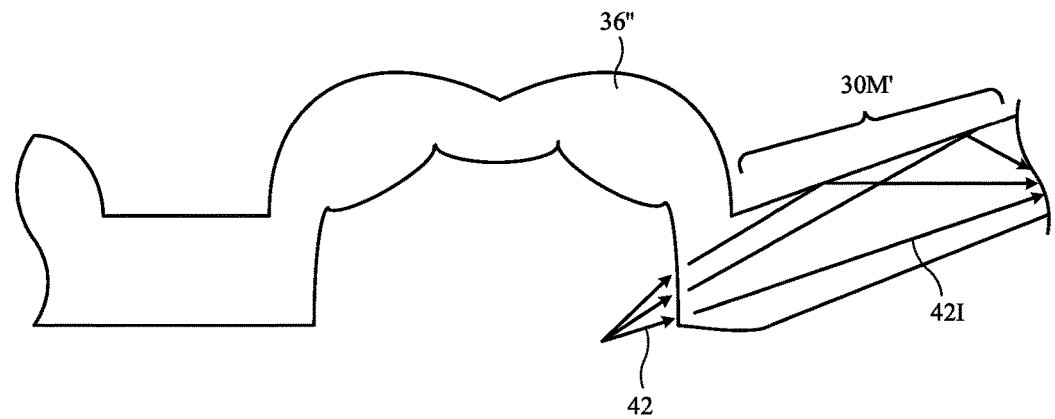
FIG. 8 is a cross-sectional side view of a portion of the illustrative optical element of FIG. 7 in accordance with an embodiment.

FIG. 8 is a close-up cross-sectional view of an illustrative lens structure 36'' associated in layer 30' of FIG. 7. As shown in FIG. 8, some of emitted light 42 from component 34 may be coupled into the interior of portion 30M' and may then proceed to be guided laterally outward within a light guide formed from extended portion 30E of layer 30' as shown by guided light rays 42I of FIG. 7. Light-extraction structures such as bevel 30B of FIG. 7 are formed in a ring shape, but other patterns of light-extraction (light-scattering) structures may be used to scatter and thereby extract light out of layer 30' for viewing by a user, if desired (e.g., icon-shaped light-scattering structures may be used, light-scattering structures may be patterned into the shape of text, graphics, or decorative patterns containing spots, wavy lines, circles, rectangles, triangles, and/or other shapes).

Figure 9:
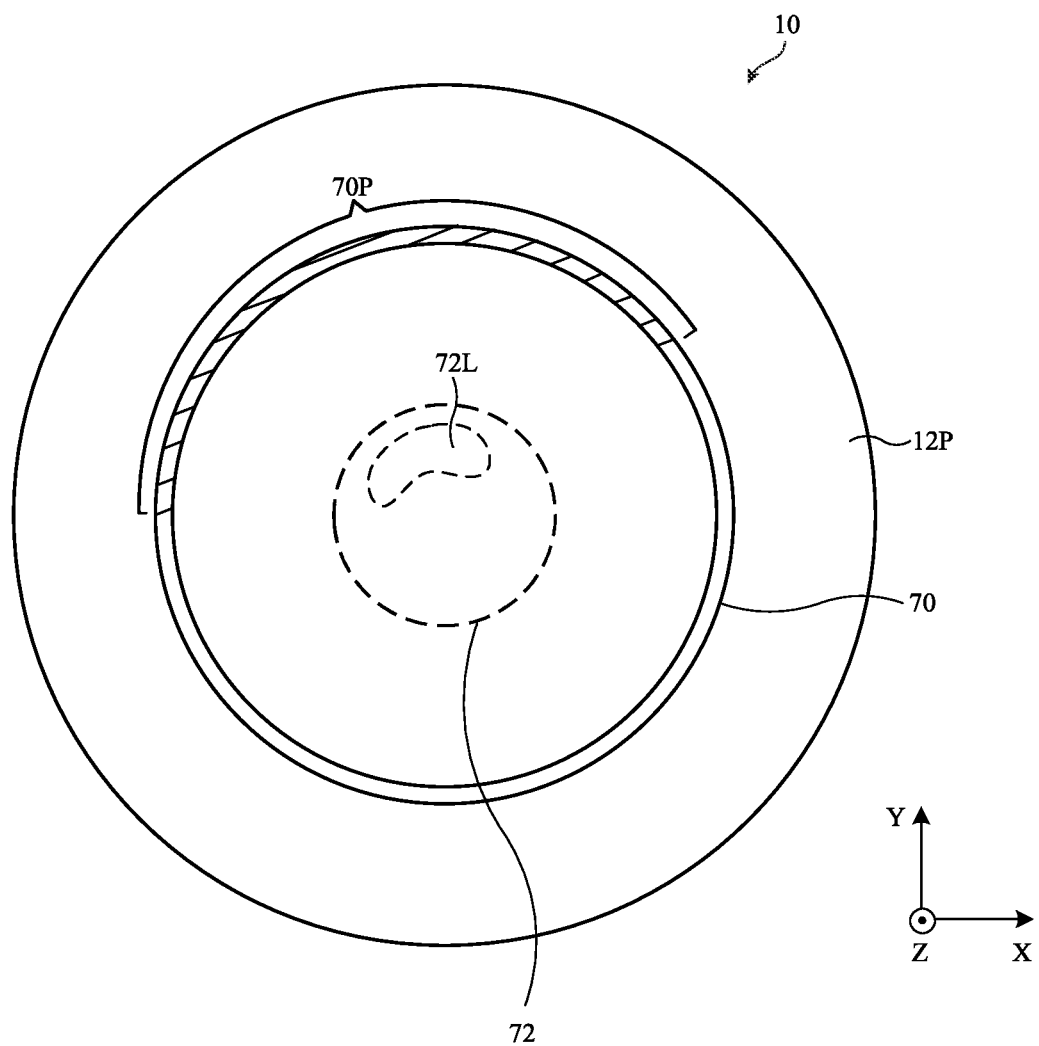
FIG. 9 is a top view of an illustrative electronic device having a light-emitting device and a light-guiding structure such as the optical element of FIG. 7 that provides light output in a ring coinciding with a circular peripheral edge of the light-guiding structure in accordance with an embodiment.

The circular shape of bevel 30B in layer 30' may create a ring of emitted light when components 34 are active. If desired, components 34 may be selectively activated to create a partially filled ring of light. This type of arrangement is shown in the top view of device 10 of FIG. 9. As shown in FIG. 9, ring 70 may coincide with the ring-shaped light emitting region associated with ring-shaped bevel 30B at the circular periphery of layer 30'. When all light-emitting components 34 are illuminated evenly, emitted light may exit ring 70 evenly (e.g., ring 70 may form an illuminated circle). Components 34 may, as an example, be formed in a hexagonal array pattern (see, e.g., FIG. 3) or other pattern in central circular region 72 under housing portion (top cap) 12P. When a subset of light-emitting components 34 are illuminated (e.g., in subregion 72L), emitted light may be concentrated in a portion of ring 70 such as illustrative portion 70P. During operation of device 10, control circuitry 20 can adjust which components 34 emit light (and the intensity and color that is emitted by active components 34). In this way, different amounts of ring 70 can be illuminated at different times and can serve as moving light decoration, may serve as status indicators (e.g., to indicate the current volume level of device 10 or other operating state information), may serve to notify a user of an incoming message or alarm (e.g., expiration of a timer), and/or may otherwise provide visual output for a user.

Figure 10:
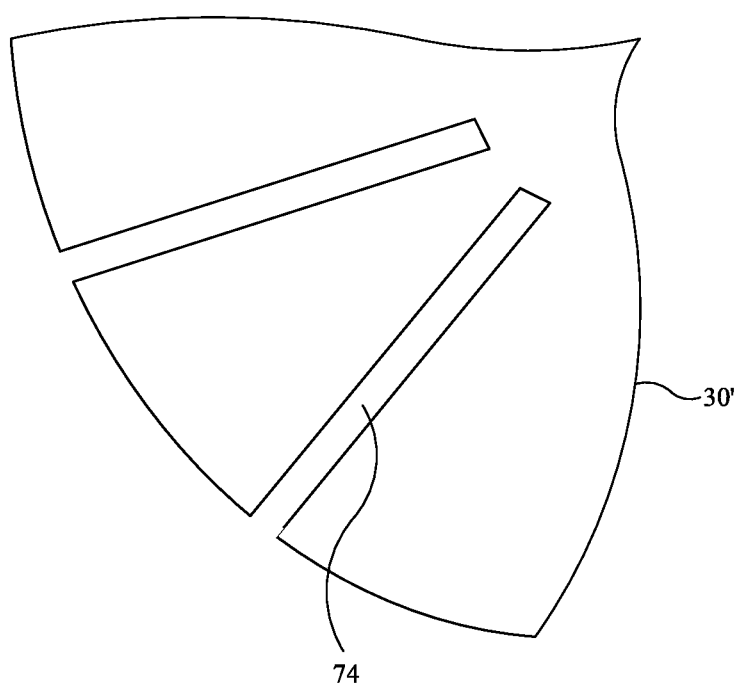
FIG. 10 is a top view of a portion of a light-guiding structure for a light-emitting device that has segments in accordance with an embodiment.

To help localize the light emitted in ring 70 (e.g., to help delineate which region the emitted light is located in), layer 30' may, if desired, have gaps such as gap 74 of FIG. 10. By segmenting layer 30' in this way, emitted light may be emitted in selectable arc-shaped bars around the periphery of layer 30. Other gap patterns may be used in restricting light guiding within layer 30', if desired.

Device 10 may be operated in a system that uses personally identifiable information. It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users The foregoing is merely illustrative and various modifications can be made to the described embodiments. The foregoing embodiments may be implemented individually or in any combination.

What is claimed is:

1. An electronic device, comprising:
 a housing;
 a speaker in the housing configured to emit sound; and
 light-emitting components configured to emit light through a portion of the housing; and
 a light-spreading layer between the light-emitting components and the portion of the housing, wherein the light-spreading layer has lenses that each overlap a respective one of the light-emitting components, wherein each lens has an upper surface with a depressed central portion and a lower surface with a protruding central portion facing the light-emitting components.

2. The electronic device defined in claim 1 wherein the housing is cylindrical and has a top and wherein the portion of the housing comprises a housing wall on the top.

3. The electronic device defined in claim 2 wherein the light-emitting components comprise light-emitting components selected from the group consisting of light-emitting diodes and lasers.

4. The electronic device defined in claim 3 wherein the light-spreading layer comprises clear polymer member containing each of the lenses.

5. The electronic device defined in claim 4 further comprising an additional light-spreading layer that overlaps the clear polymer member and that is separated from the clear polymer member by an air gap.

6. The electronic device defined in claim 5 wherein the additional light-spreading layer comprises a light-spreading layer selected from the group consisting of: a volume diffuser layer and a textured diffuser layer.

7. The electronic device defined in claim 4 wherein the clear polymer member has a light-guiding portion that is configured to guide light emitted from the light-emitting components.

8. The electronic device defined in claim 7 wherein the light-guiding portion has a peripheral edge and wherein the peripheral edge is configured to extract the guided light.

9. The electronic device defined in claim 8 wherein the peripheral edge is a circular peripheral edge and wherein the circular peripheral edge has a bevel that causes the circular peripheral edge to extract the guided light in a ring.

10. The electronic device defined in claim 4 further comprising:
a textured diffuser layer between the clear polymer member and the housing wall; and
a volume diffuser layer between the textured diffuser layer and the housing wall.

11. The electronic device defined in claim 10 wherein the volume diffuser layer is separated from the housing wall by an air gap and includes a polymer film with embedded light-scattering structures.

12. The electronic device defined in claim 11 further comprising a touch sensor between the housing wall and the volume diffuser layer.

13. The electronic device defined in claim 12 wherein the touch sensor comprises capacitive touch sensor electrodes that are formed on an inner surface of the housing wall and that are separated from the volume diffuser layer by an additional air gap.

14. The electronic device defined in claim 13 wherein the housing wall on the top comprises a polymer disk with a curved cross-sectional profile.

15. The electronic device defined in claim 14 wherein the textured diffuser layer has a substrate and a textured coating.

16. An electronic device, comprising:
a housing having a polymer member;
light-emitting components on a printed circuit;
a first light diffuser layer having lenses that each overlap a respective one of the light-emitting components and that each have outer surfaces with curved cross-sectional profiles and cuspoid central depressions and opposing inner surfaces with curved cross-sectional profiles that are separated from that overlapped light-emitting component by air;
a second light diffuser layer having a textured film with a textured surface, wherein the second light diffuser layer is between the polymer member and the first light diffuser layer and is separated from the first light diffuser layer by air;
a third light diffuser layer that has light-scattering structures embedded in polymer, wherein the third light diffuser layer is between the polymer member and the second light diffuser layer, is separated from the second light diffusing layer by air, and is separated from the polymer member by air.

17. The electronic device defined in claim 16 further comprising:
touch sensor electrodes on an inner surface of the polymer member, wherein the polymer member has a circular outline;
a speaker in the housing;
a microphone in the housing; and
control circuitry in the housing that is configured to receive voice commands using the microphone, wherein the control circuitry is configured to direct the light-emitting components to emit light that passes through the first, second, and third light diffuser layers and through the polymer member in response to the voice commands.

18. An electronic device, comprising:
a housing;
light-emitting components overlapped by the housing; and
a lens diffuser layer having a plurality of lenses and a light-guiding layer, wherein the lens diffuser layer is disposed between the light-emitting components and the housing, wherein the light-guiding layer is configured to guide light received from the light-emitting components to a circular peripheral edge of the light-guiding layer, and wherein the circular peripheral edge has a light-extraction structure configured to send the light outwardly through the housing.

19. The electronic device defined in claim 18 wherein the housing is cylindrical and has a circular polymer top cap and wherein the light-extraction structure comprises a bevel along the circular peripheral edge that sends a ring of light through the polymer top cap.

20. The electronic device defined in claim 19 wherein each of the plurality of lenses overlaps a respective one of the light-emitting components and is separated from that light-emitting component by an air gap.

* * * * *